US010154053B2

(12) United States Patent
Yadav et al.

(10) Patent No.: US 10,154,053 B2
(45) Date of Patent: Dec. 11, 2018

(54) METHOD AND APPARATUS FOR GROUPING FEATURES INTO BINS WITH SELECTED BIN BOUNDARIES FOR USE IN ANOMALY DETECTION

(71) Applicant: CISCO TECHNOLOGY, INC., San Jose, CA (US)

(72) Inventors: Navindra Yadav, Cupertino, CA (US); Ellen Scheib, Mountain View, CA (US); Rachita Agasthy, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 261 days.

(21) Appl. No.: 15/090,992

(22) Filed: Apr. 5, 2016

(65) Prior Publication Data

US 2016/0359886 A1 Dec. 8, 2016

Related U.S. Application Data

(60) Provisional application No. 62/171,044, filed on Jun. 4, 2015.

(51) Int. Cl.
*H04L 29/06* (2006.01)
*H04L 12/24* (2006.01)
*H04L 12/26* (2006.01)

(52) U.S. Cl.
CPC ........ *H04L 63/1425* (2013.01); *H04L 41/142* (2013.01); *H04L 43/062* (2013.01); *H04L 63/20* (2013.01); *H04L 41/16* (2013.01)

(58) Field of Classification Search
CPC .................................................. H04L 63/1425
See application file for complete search history.

(56) References Cited

U.S. PATENT DOCUMENTS

| 5,727,204 A | 3/1998 | Greene, VII |
| 8,938,532 B2 | 1/2015 | Terrell et al. |
| 2004/0205374 A1* | 10/2004 | Poletto ................. H04L 41/064 714/4.2 |
| 2009/0245122 A1 | 10/2009 | Maiocco et al. |
| 2011/0161484 A1 | 6/2011 | Van den Bogaert et al. |
| 2013/0051247 A1 | 2/2013 | Reese et al. |
| 2014/0215055 A1 | 7/2014 | Reynolds et al. |

OTHER PUBLICATIONS

Lorraine Denby & Colin Mallows,Variations on the Histogram,Journal of Computational and Graphical Statistics,vol. 18, Issue 1, 2009, pp. 21-31.

(Continued)

*Primary Examiner* — Simon P Kanaan
(74) *Attorney, Agent, or Firm* — Cindy Kaplan

(57) ABSTRACT

In one embodiment, a method includes receiving network data at an analytics device, identifying features for the network data at the analytics device, grouping each of the features into bins of varying width at the analytics device, the bins comprising bin boundaries selected based on a probability that data within each of the bins follows a discrete uniform distribution, and utilizing the binned features for anomaly detection. An apparatus and logic are also disclosed herein.

20 Claims, 10 Drawing Sheets

(56) References Cited

OTHER PUBLICATIONS

O'Reilly,C;Gluhak,A;Imran,M.A;Rajasegarar,S,"Anomaly Detection in Wireless Sensor Networks in a Non-Stationary Environment" IEEE , vol. 16, No. 3,pp. 1413-1432, Third Quarter 2014.
Yogesh Virkar and Aaron Clauset,Power-Law Distributions in Binned Empirical Data,The Annals of Applied Statistics,2014, vol. 8, No. 1, 89-119.
Miao Xie et al"Histogram-Based Online Anomaly Detection in Hierarchical Wireless Sensor Networks" 2012 IEEE 11th International Conference, vol, no, pp. 751-759, Jun. 25-27, 2012.
Augustin Soule et al ,"Flow classification by histograms" SIGMETRICS '04/Performance '04). ACM, New York, NY, USA, 49-60. 2004.
Faria Leal,S;et al."Anomaly detection of Internet traffic using robust feature selection based on kernel density estimation" EuCNC,pp. 482-486,Jun. 29-Jul. 2, 2015.

\* cited by examiner

METHOD AND APPARATUS FOR GROUPING FEATURES INTO BINS WITH SELECTED BIN BOUNDARIES FOR USE IN ANOMALY DETECTION

STATEMENT OF RELATED APPLICATION

The present application claims priority from U.S. Provisional Application No. 62/171,044, entitled ANOMALY DETECTION WITH PERVASIVE VIEW OF NETWORK BEHAVIOR, filed on Jun. 4, 2015. The contents of this provisional application are incorporated herein by reference in its entirety.

TECHNICAL FIELD

The present disclosure relates generally to communication networks, and more particularly, to grouping of features for use in anomaly detection.

BACKGROUND

Anomaly detection is used to identify items, events, or traffic that exhibit behavior that does not conform to an expected pattern or data. Anomaly detection systems may, for example, learn normal activity and take action for behavior that deviates from what is learned as normal behavior. Network data features may be grouped and then serve as input to downstream algorithms used to identify anomalous network behavior.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
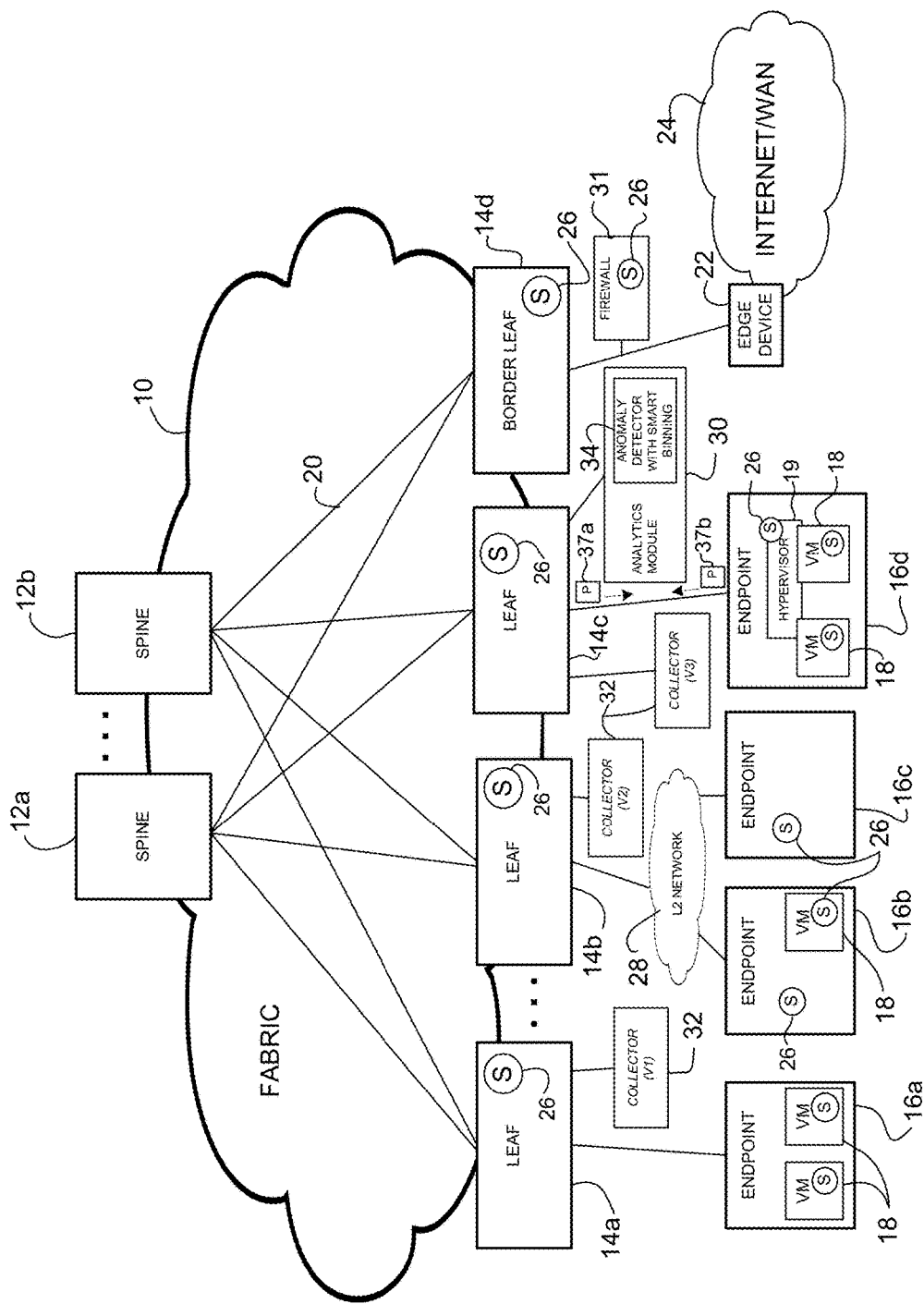
FIG. 1 illustrates an example of a network in which embodiments described herein may be implemented.

In one embodiment, a method generally comprises receiving network data at an analytics device, identifying features for the network data at the analytics device, grouping each of the features into bins of varying width at the analytics device, the bins comprising bin boundaries selected based on a probability that data within each of the bins follows a discrete uniform distribution, and utilizing the binned features for anomaly detection.

In another embodiment, an apparatus generally comprises an interface for receiving network data and a processor for identifying features for the network data, grouping each of the features into bins of varying width, and utilizing the binned features for anomaly detection. The bins comprise bin boundaries selected based on a probability that data within each of the bins follows a discrete uniform distribution.

In yet another embodiment, logic is encoded on one or more non-transitory computer readable media for execution and when executed operable to identify features for network data, group each of the features into bins of varying width, the bins comprising bin boundaries selected based on a probability that data within each of the bins follows a discrete uniform distribution, and utilize the binned features for anomaly detection.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Network metadata with high dimensionality is a powerful data source, yet may be difficult to analyze and draw conclusions from without processing the information in a meaningful way. The features often exhibit irregular and spiky distributions. Data collection, grouping, and analysis in conventional anomaly detection systems may limit data visibility and result in failure to detect certain anomalies. For example, conventional grouping of features may smooth over spikiness, resulting in a loss of important information about values of these spikes. Conventional techniques may also miss meaningful gaps or sparseness seen in network data distributions, thus resulting in failure to detect certain anomalies.

The embodiments described herein provide for grouping (binning) of features for scaling and density estimation purposes for use in anomaly detection. The grouping preserves the richness and uniqueness exhibited in network metadata. The anomaly detection may be used, for example, to identify suspicious network activity potentially indicative of malicious behavior. The identified anomaly may be used for downstream purposes including network forensics, policy decision making, and enforcement, for example.

Network data may be collected throughout a network such as a data center using multiple vantage points. This provides a pervasive view of network behavior, using metadata from every (or almost every) packet. In one or more embodiments, an analytics system (referred to as Tetration Analytics) provides a big data analytics platform that monitors everything (or almost everything) while providing pervasive security. One or more embodiments may provide visibility from every (or almost every) host, process, and user perspective. The network metadata may be combined in a central big data analytics platform for analysis. With information about network behavior captured from multiple perspectives, the various data sources can be correlated to provide a powerful information source for data analytics.

The comprehensive and pervasive information about network behavior that is collected over time and stored in a central location enables the use of machine learning algorithms to detect suspicious activity. Multiple approaches to modeling normal or typical network behavior may be used and activity that does not conform to this expected behavior may be flagged as suspicious, and may be investigated. Machine learning allows for the identification of anomalies within the network traffic based on dynamic modeling of network behavior.

Referring now to the drawings, and first to FIG. 1, a simplified network in which embodiments described herein may be implemented is shown. The embodiments operate in the context of a data communication network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network. The nodes may communicate over one or more networks (e.g., local area network (LAN), metropolitan area network (MAN), wide area network (WAN), virtual private network (VPN), virtual local area network (VLAN), wireless network, enterprise network, corporate network, Internet, intranet, radio access network, public switched network, or any other network). Network traffic may also travel between a main campus and remote branches or any other networks.

In the example of FIG. 1, a fabric 10 comprises a plurality of spine nodes 12a, 12b and leaf nodes 14a, 14b, 14c, 14d. The leaf nodes 14a, 14b, 14c, may connect to one or more endpoints (hosts) 16a, 16b, 16c, 16d (e.g., servers hosting virtual machines (VMs) 18). The leaf nodes 14a, 14b, 14c, 14d are each connected to a plurality of spine nodes 12a, 12b via links 20. In the example shown in FIG. 1, each leaf node 14a, 14b, 14c, 14d is connected to each of the spine nodes 12a, 12b and is configured to route communications between the hosts 16a, 16b, 16c, 16d and other network elements.

The leaf nodes 14a, 14b, 14c, 14d and hosts 16a, 16b, 16c, 16d may be in communication via any number of nodes or networks. As shown in the example of FIG. 1, one or more servers 16b, 16c may be in communication via a network 28 (e.g., layer 2 (L2) network). In the example shown in FIG. 1, border leaf node 14d is in communication with an edge device 22 (e.g., router) located in an external network 24 (e.g., Internet/WAN (Wide Area Network)). The border leaf 14d may be used to connect any type of external network device, service (e.g., firewall 31), or network (e.g., layer 3 (L3) network) to the fabric 10.

The spine nodes 12a, 12b and leaf nodes 14a, 14b, 14c, 14d may be switches, routers, or other network devices (e.g., L2, L3, or L2/L3 devices) comprising network switching or routing elements configured to perform forwarding functions. The leaf nodes 14a, 14b, 14c, 14d may include, for example, access ports (or non-fabric ports) to provide connectivity for hosts 16a, 16b, 16c, 16d, virtual machines 18, or other devices or external networks (e.g., network 24), and fabric ports for providing uplinks to spine switches 12a, 12b.

The leaf nodes 14a, 14b, 14c, 14d may be implemented, for example, as switching elements (e.g., Top of Rack (ToR) switches) or any other network element. The leaf nodes 14a, 14b, 14c, 14d may also comprise aggregation switches in an end-of-row or middle-of-row topology, or any other topology. The leaf nodes 14a, 14b, 14c, 14d may be located at the edge of the network fabric 10 and thus represent the physical network edge. One or more of the leaf nodes 14a, 14b, 14c, 14d may connect Endpoint Groups (EGPs) to network fabric 10, internal networks (e.g., network 28), or any external network (e.g., network 24). EPGs may be used, for example, for mapping applications to the network.

Endpoints 16a, 16b, 16c, 16d may connect to network fabric 10 via the leaf nodes 14a, 14b, 14c. In the example shown in FIG. 1, endpoints 16a and 16d connect directly to leaf nodes 14a and 14c, respectively, which can connect the hosts to the network fabric 10 or any other of the leaf nodes. Endpoints 16b and 16c connect to leaf node 14b via L2 network 28. Endpoints 16b, 16c and L2 network 28 may define a LAN (Local Area Network). The LAN may connect nodes over dedicated private communication links located in the same general physical location, such as a building or campus.

WAN 24 may connect to leaf node 14d via an L3 network (not shown). The WAN 24 may connect geographically dispersed nodes over long distance communication links, such as common carrier telephone lines, optical lightpaths, synchronous optical networks (SONETs), or synchronous digital hierarchy (SDH) links. The Internet is an example of a WAN that connects disparate networks and provides global communication between nodes on various networks. The nodes may communicate over the network by exchanging discrete frames or packets of data according to predefined protocols, such as Transmission Control Protocol (TCP)/Internet Protocol (IP).

One or more of the endpoints may have instantiated thereon one or more virtual switches (not shown) for communication with one or more virtual machines 18. Virtual switches and virtual machines 18 may be created and run on each physical server on top of a hypervisor 19 installed on the server, as shown for endpoint 16d. For ease of illustration, the hypervisor 19 is only shown on endpoint 16d, but it is to be understood that one or more of the other endpoints having virtual machines 18 installed thereon may also comprise a hypervisor. Also, one or more of the endpoints may include a virtual switch. The virtual machines 18 are configured to exchange communication with other virtual machines. The network may include any number of physical servers hosting any number of virtual machines 18. The host may also comprise blade/physical servers without virtual machines (e.g., host 16c in FIG. 1).

The term 'host' or 'endpoint' as used herein may refer to a physical device (e.g., server, endpoint 16a, 16b, 16c, 16d) or a virtual element (e.g., virtual machine 18). The endpoint may include any communication device or component, such as a computer, server, hypervisor, virtual machine, container, process (e.g., running on a virtual machine), switch, router, gateway, host, device, external network, etc.

One or more network devices may be configured with virtual tunnel endpoint (VTEP) functionality, which connects an overlay network (not shown) with network fabric 10. The overlay network may allow virtual networks to be created and layered over a physical network infrastructure.

The embodiments include a network behavior data collection and analytics system comprising a plurality of sensors 26 located throughout the network, collectors 32, and analytics module 30. The data monitoring and collection system may be integrated with existing switching hardware and software and operate within an Application-Centric Infrastructure (ACI), for example.

In certain embodiments, the sensors 26 are located at components throughout the network so that all packets are monitored. For example, the sensors 26 may be used to collect metadata for every packet traversing the network (e.g., east-west, north-south). The sensors 26 may be installed in network components to obtain network traffic data from packets transmitted from and received at the network components and monitor all network flows within the network. The term 'component' as used herein may refer to a component of the network (e.g., process, module, slice, blade, server, hypervisor, machine, virtual machine, switch, router, gateway, etc.).

In some embodiments, the sensors 26 are located at each network component to allow for granular packet statistics and data at each hop of data transmission. In other embodiments, sensors 26 may not be installed in all components or portions of the network (e.g., shared hosting environment in which customers have exclusive control of some virtual machines 18).

The sensors 26 may reside on nodes of a data center network (e.g., virtual partition, hypervisor, physical server, switch, router, gateway, or any other network device). In the example shown in FIG. 1, the sensors 26 are located at server 16c, virtual machines 18, hypervisor 19, leaf nodes 14a, 14b, 14c, 14d, and firewall 31. The sensors 26 may also be located at one or more spine nodes 12a, 12b or interposed between network elements.

A network device (e.g., endpoints 16a, 16b, 16d) may include multiple sensors 26 running on various components within the device (e.g., virtual machines, hypervisor, host) so that all packets are monitored (e.g., packets 37a, 37b to and from components). For example, network device 16d in the example of FIG. 1 includes sensors 26 residing on the hypervisor 19 and virtual machines 18 running on the host.

The installation of the sensors 26 at components throughout the network allows for analysis of network traffic data to and from each point along the path of a packet within the ACI. This layered sensor structure provides for identification of the component (i.e., virtual machine, hypervisor, switch) that sent the data and when the data was sent, as well as the particular characteristics of the packets sent and received at each point in the network. This also allows for the determination of which specific process and virtual machine 18 is associated with a network flow. In order to make this determination, the sensor 26 running on the virtual machine 18 associated with the flow may analyze the traffic from the virtual machine, as well as all the processes running on the virtual machine and, based on the traffic from the virtual machine, and the processes running on the virtual machine, the sensor 26 can extract flow and process information to determine specifically which process in the virtual machine is responsible for the flow. The sensor 26 may also extract user information in order to identify which user and process is associated with a particular flow. In one example, the sensor 26 may then label the process and user information and send it to the collector 32, which collects the statistics and analytics data for the various sensors 26 in the virtual machines 18, hypervisors 19, and switches 14a, 14b, 14c, 14d.

As previously described, the sensors 26 are located to identify packets and network flows transmitted throughout the system. For example, if one of the VMs 18 running at host 16d receives a packet 37a from the Internet 24, it may pass through router 22, firewall 31, switches 14d, 14c, hypervisor 19, and the VM. Since each of these components contains a sensor 26, the packet 37a will be identified and reported to collectors 32. In another example, if packet 37b is transmitted from VM 18 running on host 16d to VM 18 running on host 16a, sensors installed along the data path including at VM 18, hypervisor 19, leaf node 14c, leaf node 14a, and the VM at node 16a will collect metadata from the packet.

The sensors 26 may be used to collect information including, but not limited to, network information comprising metadata from every (or almost every) packet, process information, user information, virtual machine information, tenant information, network topology information, or other information based on data collected from each packet transmitted on the data path. The network traffic data may be associated with a packet, collection of packets, flow, group of flows, etc. The network traffic data may comprise, for example, VM ID, sensor ID, associated process ID, associated process name, process user name, sensor private key, geo-location of sensor, environmental details, etc. The network traffic data may also include information describing communication on all layers of the OSI (Open Systems Interconnection) model. For example, the network traffic data may include signal strength (if applicable), source/destination MAC (Media Access Control) address, source/destination IP (Internet Protocol) address, protocol, port number, encryption data, requesting process, sample packet, etc. In one or more embodiments, the sensors 26 may be configured to capture only a representative sample of packets.

The system may also collect network performance data, which may include, for example, information specific to file transfers initiated by the network devices, exchanged emails, retransmitted files, registry access, file access, network failures, component failures, and the like. Other data such as bandwidth, throughput, latency, jitter, error rate, and the like may also be collected.

Since the sensors 26 are located throughout the network, the data is collected using multiple vantage points (i.e., from multiple perspectives in the network) to provide a pervasive view of network behavior. The capture of network behavior information from multiple perspectives rather than just at a single sensor located in the data path or in communication with a component in the data path, allows data to be correlated from the various data sources to provide a useful information source for data analytics and anomaly detection. For example, the plurality of sensors 26 providing data to the collectors 32 may provide information from various network perspectives (view V1, view V2, view V3, etc.), as shown in FIG. 1.

The sensors 26 may comprise, for example, software (e.g., running on a virtual machine, container, virtual switch, hypervisor, physical server, or other device), an application-specific integrated circuit (ASIC) (e.g., component of a switch, gateway, router, standalone packet monitor, PCAP (packet capture) module), or other device. The sensors 26 may also operate at an operating system (e.g., Linux, Windows) or bare metal environment. In one example, the ASIC may be operable to provide an export interval of 10 msecs to 1000 msecs (or more or less) and the software may be operable to provide an export interval of approximately one second (or more or less). Sensors 26 may be lightweight, thereby minimally impacting normal traffic and compute resources in a data center. The sensors 26 may, for example, sniff packets sent over its host Network Interface Card (NIC) or individual processes may be configured to report traffic to the sensors. Sensor enforcement may comprise, for example, hardware, ACI/standalone, software, IP tables, Windows filtering platform, etc.

As the sensors 26 capture communications, they may continuously send network traffic data to collectors 32 for storage. The sensors may be used to collect data from streaming data, for example. The sensors 26 may send their records to one or more of the collectors 32. In one example, the sensors may be assigned primary and secondary collectors 32. In another example, the sensors 26 may determine an optimal collector 32 through a discovery process.

In certain embodiments, the sensors 26 may preprocess network traffic data before sending it to the collectors 32. For example, the sensors 26 may remove extraneous or duplicative data or create a summary of the data (e.g., latency, packets, bytes sent per flow, flagged abnormal activity, etc.). The collectors 32 may serve as network storage for the system or the collectors may organize, summarize, and preprocess data. For example, the collectors 32 may tabulate data, characterize traffic flows, match packets to identify traffic flows and connection links, or flag anomalous data. The collectors 32 may also consolidate network traffic flow data according to various time periods.

Information collected at the collectors 32 may include, for example, network information (e.g., metadata from every packet, east-west and north-south), process information, user information (e.g., user identification (ID), user group, user credentials), virtual machine information (e.g., VM ID, processing capabilities, location, state), tenant information (e.g., access control lists), network topology, etc. Collected data may also comprise packet flow data that describes packet flow information or is derived from packet flow information, which may include, for example, a five-tuple or other set of values that are common to all packets that are related in a flow (e.g., source address, destination address, source port, destination port, and protocol value, or any combination of these or other identifiers). The collectors 32 may utilize various types of database structures and memory, which may have various formats or schemas.

In some embodiments, the collectors 32 may be directly connected to a top-of-rack switch (e.g., leaf node). In other embodiments, the collectors 32 may be located near an end-of-row switch. In certain embodiments, one or more of the leaf nodes 14a, 14b, 14c, 14d may each have an associated collector 32. For example, if the leaf node is a top-of-rack switch, then each rack may contain an assigned collector 32. The system may include any number of collectors 32 (e.g., one or more).

The analytics module 30 is configured to receive and process network traffic data collected by collectors 32 and detected by sensors 26 placed on nodes located throughout the network. The analytics module 30 may be, for example, a standalone network appliance or implemented as a VM image that can be distributed onto a VM, cluster of VMs, Software as a Service (SaaS), or other suitable distribution model. The analytics module 30 may also be located at one of the endpoints or other network device, or distributed among one or more network devices.

In certain embodiments, the analytics module 30 may determine dependencies of components within the network using an application dependency module. The analytics module 30 may establish patterns and norms for component behavior or address policy usage. In one embodiment, the analytics module 30 may also discover applications or select machines on which to discover applications, and then run application dependency algorithms.

In certain embodiments, the analytics module 30 may be implemented in an active-standby model to ensure high availability, with a first analytics module functioning in a primary role and a second analytics module functioning in a secondary role. If the first analytics module fails, the second analytics module can take over control.

As shown in FIG. 1, the analytics module 30 includes an anomaly detector 34. The anomaly detector 34 may operate at any computer or network device (e.g., server, controller, appliance, management station, or other processing device or network element) operable to receive network performance data and, based on the received information, identify features in which an anomaly deviates from other features. The anomaly detection module 34 may, for example, learn what causes security violations by monitoring and analyzing behavior and events that occur prior to the security violation taking place, in order to prevent such events from occurring in the future.

Computer networks may be exposed to a variety of different attacks that expose vulnerabilities of computer systems in order to compromise their security. For example, network traffic transmitted on networks may be associated with malicious programs or devices. The anomaly detection module 34 may be provided with examples of network states corresponding to an attack and network states corresponding to normal operation. The anomaly detection module 34 can then analyze network traffic flow data to recognize when the network is under attack. In some example embodiments, the network may operate within a trusted environment for a period of time so that the anomaly detector 34 can establish a baseline normalcy. The analytics module 30 may include a database or norms and expectations for various components. The database may incorporate data from external sources. In certain embodiments, the analytics module 30 may use machine learning techniques to identify security threats to a network using the anomaly detection module 34. Since malware is constantly evolving and changing, machine learning may be used to dynamically update models that are used to identify malicious traffic patterns. Machine learning algorithms are used to provide for the identification of anomalies within the network traffic based on dynamic modeling of network behavior.

The anomaly detection module 34 may be used to identify observations which differ from other examples in a dataset. For example, if a training set of example data with known outlier labels exists, supervised anomaly detection techniques may be used. Supervised anomaly detection techniques utilize data sets that have been labeled as "normal" and "abnormal" and train a classifier. In a case in which it is unknown whether examples in the training data are outliers, unsupervised anomaly techniques may be used. Unsupervised anomaly detection techniques may be used to detect anomalies in an unlabeled test data set under the assumption that the majority of instances in the data set are normal by looking for instances that seem to fit to the remainder of the data set.

As described in detail below, the anomaly detector 34 may comprise a smart binning module operable to bin features for scaling and density estimation purposes. The smart binning module may be used to summarize numeric discrete features in a meaningful way, thereby retaining important transitions exhibited in the data. The network data features may grouped into bins of varying width, with each bin modeled using a discrete uniform distribution and bin boundaries selected to retain the spikiness in the distribution. These binned features may then serve as input to downstream algorithms flagging unexpected network behavior.

It is to be understood that the network devices and topology shown in FIG. 1 and described above is only an example and the embodiments described herein may be implemented in networks comprising different network topologies or network devices, or using different protocols, without departing from the scope of the embodiments. For example, although network fabric 10 is illustrated and described herein as a leaf-spine architecture, the embodiments may be implemented based on any network topology, including any data center or cloud network fabric. The embodiments described herein may be implemented, for example, in other topologies including three-tier (e.g., core, aggregation, and access levels), fat tree, mesh, bus, hub and spoke, etc. The sensors 26 and collectors 32 may be placed throughout the network as appropriate according to various architectures. Furthermore, the smart binning at anomaly detector 34 may use network data (metadata) collected from any number of sensors either directly or via one or more collectors from any number of locations within the network. Thus, the smart binning embodiments described herein may be used in any network topology comprising any number or arrangement of data sensors or collectors. The network may include any number or type of network devices that facilitate passage of data over the network (e.g., routers, switches, gateways, controllers, appliances), network elements that operate as endpoints or hosts (e.g., servers, virtual machines, clients), and any number of network sites or domains in communication with any number of networks.

Moreover, the topology illustrated in FIG. 1 and described above is readily scalable and may accommodate a large number of components, as well as more complicated arrangements and configurations. For example, the network may include any number of fabrics 10, which may be geographically dispersed or located in the same geographic area. Thus, network nodes may be used in any suitable network topology, which may include any number of servers, virtual machines, switches, routers, appliances, controllers, gateways, or other nodes interconnected to form a large and complex network, which may include cloud or fog computing. Nodes may be coupled to other nodes or networks through one or more interfaces employing any suitable wired or wireless connection, which provides a viable pathway for electronic communications.

Figure 2:
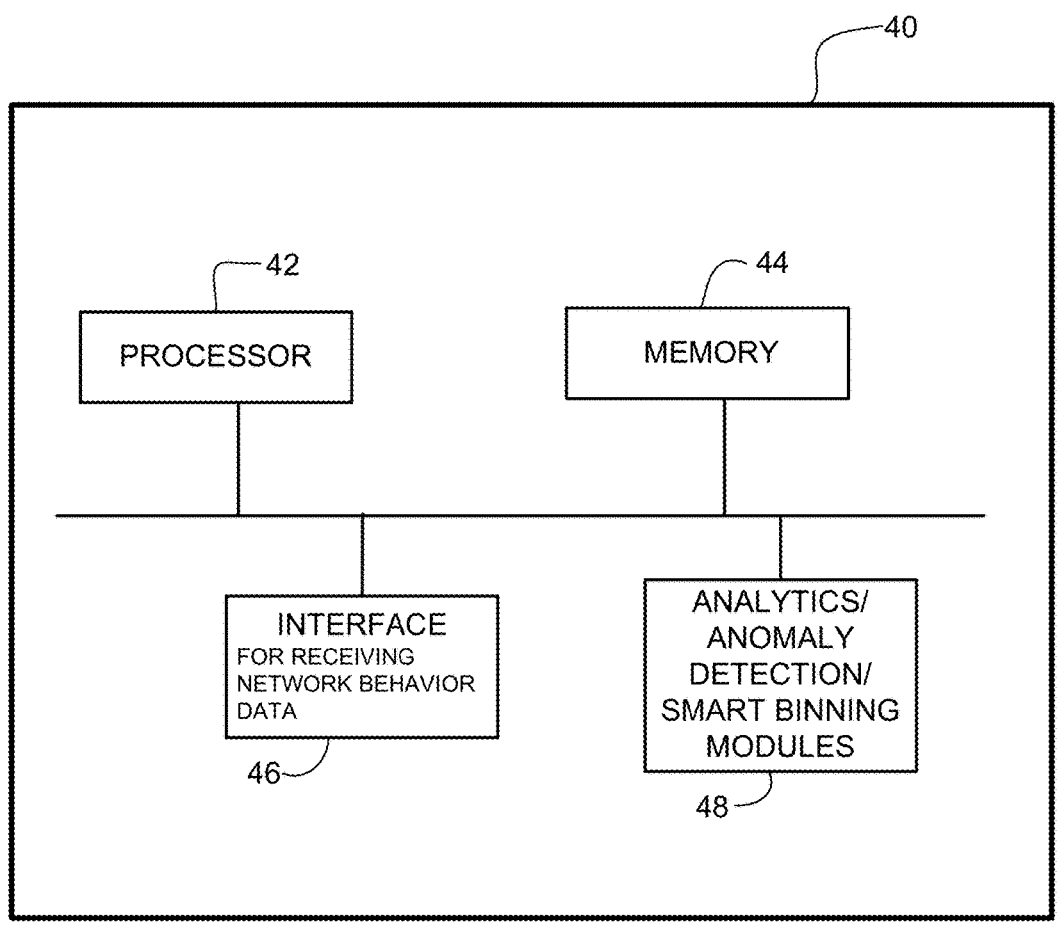
FIG. 2 depicts an example of a network device useful in implementing embodiments described herein.

FIG. 2 illustrates an example of a network device 40 that may be used to implement the embodiments described herein. In one embodiment, the network device 40 is a programmable machine that may be implemented in hardware, software, or any combination thereof. The network device 40 includes one or more processor 42, memory 44, network interface 46, and analytics/anomaly detection/smart binning modules 48 (analytics module 30, anomaly detector 34 shown in FIG. 1).

Memory 44 may be a volatile memory or non-volatile storage, which stores various applications, operating systems, modules, and data for execution and use by the processor 42. For example, analytics/anomaly detection/smart binning components (e.g., module, code, logic, software, firmware, etc.) may be stored in memory 44. The device may include any number of memory components.

Logic may be encoded in one or more tangible media for execution by the processor 42. For example, the processor 42 may execute codes stored in a computer-readable medium such as memory 44 to perform the processes described below with respect to FIGS. 5, 6, and 10. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The network device may include any number of processors 42. In one example, the computer-readable medium comprises a non-transitory computer-readable medium.

The network interface 46 may comprise any number of interfaces (linecards, ports) for receiving data or transmitting data to other devices. The network interface 46 may include, for example, an Ethernet interface for connection to a computer or network. As shown in FIG. 1 and described above, the interface 46 may be configured to receive traffic data collected from a plurality of sensors 26 distributed throughout the network. The network interface 46 may be configured to transmit or receive data using a variety of different communication protocols. The interface may include mechanical, electrical, and signaling circuitry for communicating data over physical links coupled to the network. The network device 40 may further include any number of input or output devices.

It is to be understood that the network device 40 shown in FIG. 2 and described above is only an example and that different configurations of network devices may be used. For example, the network device 40 may further include any suitable combination of hardware, software, processors, devices, components, modules, or elements operable to facilitate the capabilities described herein.

Figure 3:
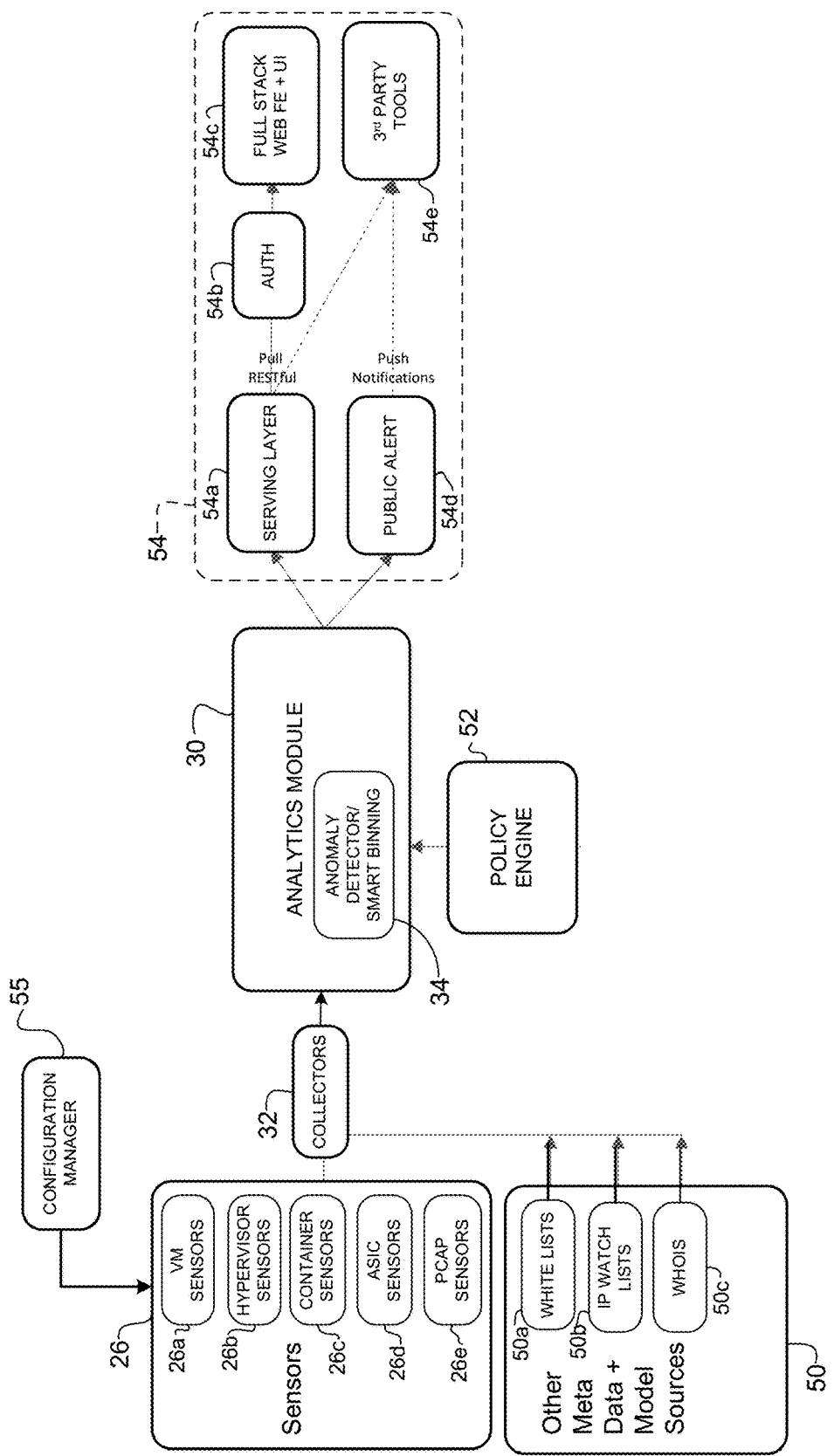
FIG. 3 illustrates a network behavior collection and analytics system for use in anomaly detection, in accordance with one embodiment.

FIG. 3 illustrates an example of a network behavior data collection and analytics system in accordance with one embodiment. The system may include sensors 26, collectors 32, and analytics module (engine) 30 described above with respect to FIG. 1. In the example shown in FIG. 3, the system further includes external data sources 50, policy engine 52, and presentation module 54. The analytics module 30 receives input from the sensors 26 via collectors 32 and from external data sources 50, while also interacting with the policy engine 52, which may receive input from a network/security policy controller (not shown). The analytics module 30 may provide input (e.g., via pull or push notifications) to a user interface or third party tools, via presentation module 54, for example.

In one embodiment, the sensors 26 may be provisioned and maintained by a configuration and image manager 55. For example, when a new virtual machine 18 is instantiated or when an existing VM migrates, configuration manager 55 may provision and configure a new sensor 26 on the VM (FIGS. 1 and 3).

As previously described, the sensors 26 may reside on nodes of a data center network. One or more of the sensors 26 may comprise, for example, software (e.g., piece of software running (residing) on a virtual partition, which may be an instance of a VM (VM sensor 26a), hypervisor (hypervisor sensor 26b), sandbox, container (container sensor 26c), virtual switch, physical server, or any other environment in which software is operating). The sensor 26 may also comprise an application-specific integrated circuit (ASIC) (ASIC sensor 26d) (e.g., component of a switch, gateway, router, standalone packet monitor, or other network device including a packet capture (PCAP) module (PCAP sensor 26e) or similar technology), or an independent unit (e.g., device connected to a network device's monitoring port or a device connected in series along a main trunk (link, path) of a data center).

The sensors 26 may send their records over a high-speed connection to one or more of the collectors 32 for storage. In certain embodiments, one or more collectors 32 may receive data from external data sources 50 (e.g., whitelists 50a, IP watch lists 50b, Whois data 50c, or out-of-band data.

In one or more embodiments, the system may comprise a wide bandwidth connection between collectors 32 and analytics module 30.

As described above, the analytics module 30 comprises an anomaly detection module 34, which may use machine learning techniques to identify security threats to a network. Anomaly detection module 34 may include examples of network states corresponding to an attack and network states corresponding to normal operation. The anomaly detection module 34 can then analyze network traffic flow data to recognize when the network is under attack. The analytics module 30 may store norms and expectations for various components in a database, which may also incorporate data from external sources 50. Analytics module 30 may then create access policies for how components can interact using policy engine 52. Policies may also be established external to the system and the policy engine 52 may incorporate them into the analytics module 30. As described below, the anomaly detector 34 may be configured for smart binning to group network data features for use in density estimation purposes. Details of processing that may be performed by the anomaly detector 34 are described below with respect to FIGS. 5, 6, and 10.

The presentation module 54 provides an external interface for the system and may include, for example, a serving layer 54a, authentication module 54b, web front end and UI (User Interface) 54c, public alert module 54d, and third party tools 54e. The presentation module 54 may preprocess, summarize, filter, or organize data for external presentation.

Figure 9:
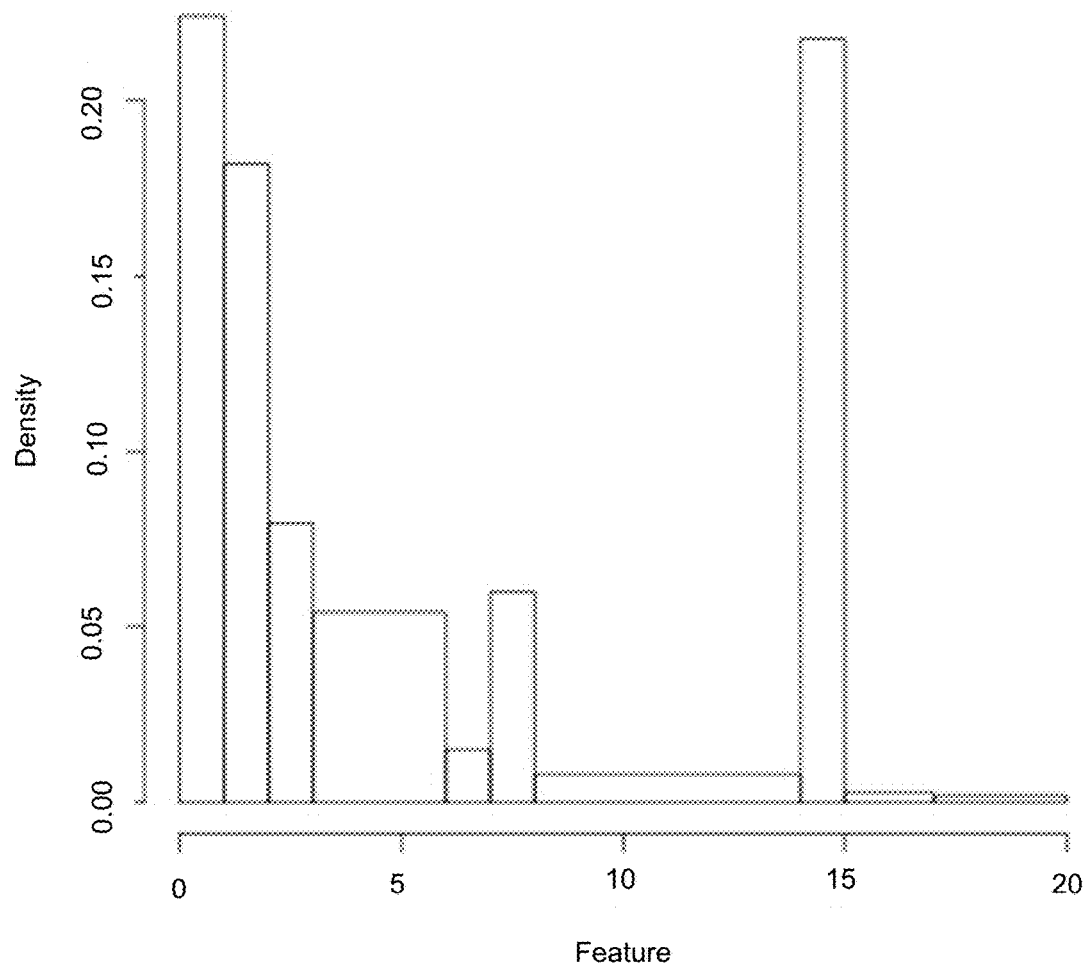
FIG. 9 illustrates an example of feature distribution with smart binning based on univariate transition points.

The serving layer 54a may operate as the interface between presentation module 54 and the analytics module 30. The presentation module 54 may be used to generate a webpage. The web front end 54c may, for example, connect with the serving layer 54a to present data from the serving layer in a webpage comprising bar charts, core charts, tree maps, acyclic dependency maps, line graphs, tables, and the like. In one example, the presentation module 54 may be used to present histograms, such as shown in FIG. 9, to indicate density of various feature values based on smart binning as described below.

The public alert module 54d may use analytic data generated or accessible through analytics module 30 and identify network conditions that satisfy specified criteria and push alerts to the third party tools 54e. One example of a third party tool 54e is a Security Information and Event Management (SIEM) system. Third party tools 54e may retrieve information from serving layer 54a through an API (Application Programming Interface) and present the information according to the SIEM's user interface, for example.

Figure 4:
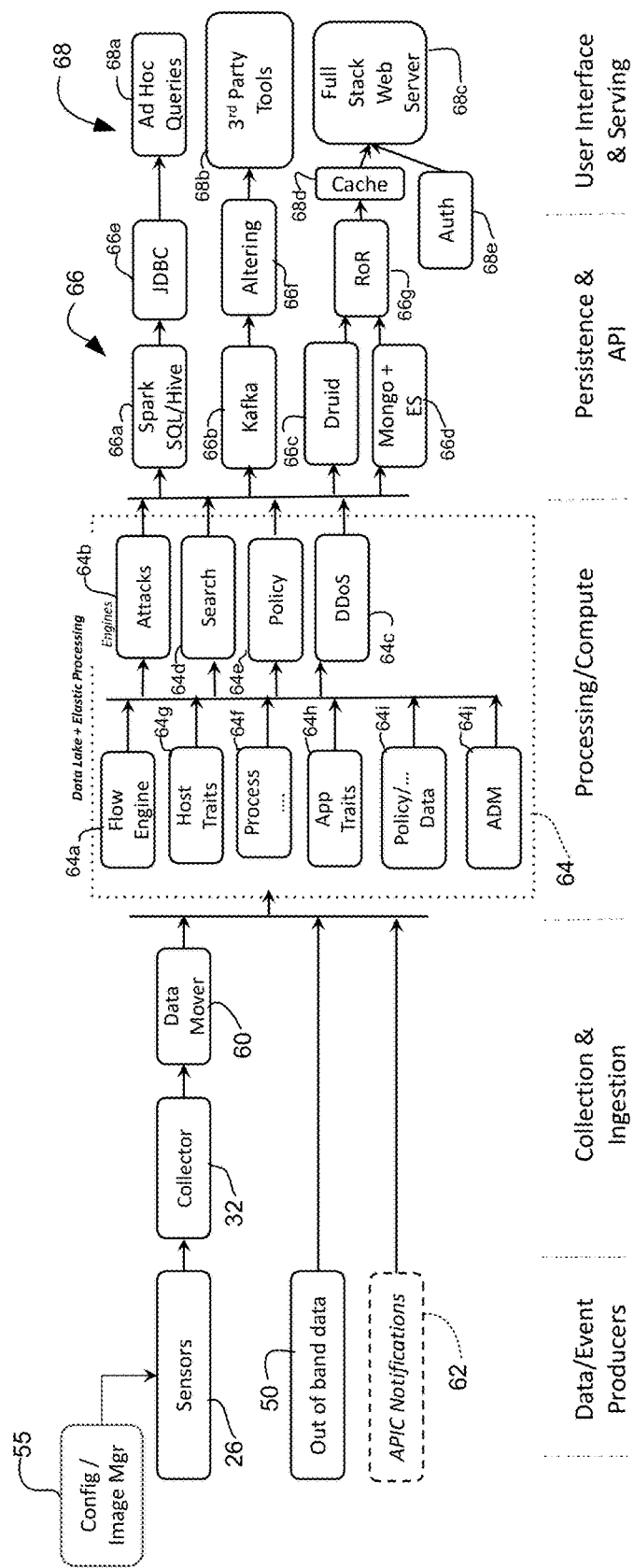
FIG. 4 illustrates details of the system of FIG. 3, in accordance with one embodiment.

FIG. 4 illustrates an example of a data processing architecture of the network behavior data collection and analytics system shown in FIG. 3, in accordance with one embodiment. As previously described, the system includes a configuration/image manager 55 that may be used to configure or manage the sensors 26, which provide data to one or more collectors 32. A data mover 60 transmits data from the collector 32 to one or more processing engines 64. The processing engine 64 may also receive out of band data 50 or APIC (Application Policy Infrastructure Controller) notifications 62. Data may be received and processed at a data lake or other storage repository. The data lake may be configured, for example, to store 275 Tbytes (or more or less) of raw data. The system may include any number of engines, including for example, engines for identifying flows (flow engine 64a) or attacks including DDoS (Distributed Denial of Service) attacks (attack engine 64b, DDoS engine 64c). The system may further include a search engine 64d and policy engine 64e. The search engine 64d may be configured, for example to perform a structured search, an NLP (Natural Language Processing) search, or a visual search. Data may be provided to the engines from one or more processing components.

The processing/compute engine 64 may further include processing component 64f operable, for example, to identify host traits 64g and application traits 64h and to perform application dependency mapping (ADM 64j). The process 64f may include, for example, a smart binning process described below. The DDoS engine 64c may generate models online while the ADM 64j generates models offline, for example. In one embodiment, the processing engine is a horizontally scalable system that includes predefined static behavior rules. The compute engine may receive data from one or more policy/data processing components 64i.

The traffic monitoring system may further include a persistence and API (Application Programming Interface) portion, generally indicated at 66. This portion of the system may include various database programs and access protocols (e.g., Spark, Hive, SQL (Structured Query Language) 66a, Kafka 66b, Druid 66c, Mongo 66d), which interface with database programs (e.g. JDBC (JAVA Database Connectivity) 66e, altering 66f, RoR (Ruby on Rails) 66g). These or other applications may be used to identify, organize, summarize, or present data for use at the user interface and serving components, generally indicated at 68, and described above with respect to FIG. 3. User interface and serving segment 68 may include various interfaces, including for example, ad hoc queries 68a, third party tools 68b, and full stack web server 68c, which may receive input from cache 68d and authentication module 68e.

It is to be understood that the system and architecture shown in FIGS. 3 and 4, and described above is only an example and that the system may include any number or type of components (e.g., databases, processes, applications, modules, engines, interfaces) arranged in various configurations or architectures, without departing from the scope of the embodiments. For example, sensors 26 and collectors 32 may belong to one hardware or software module or multiple separate modules. Other modules may also be combined into fewer components or further divided into more components.

Figure 5:
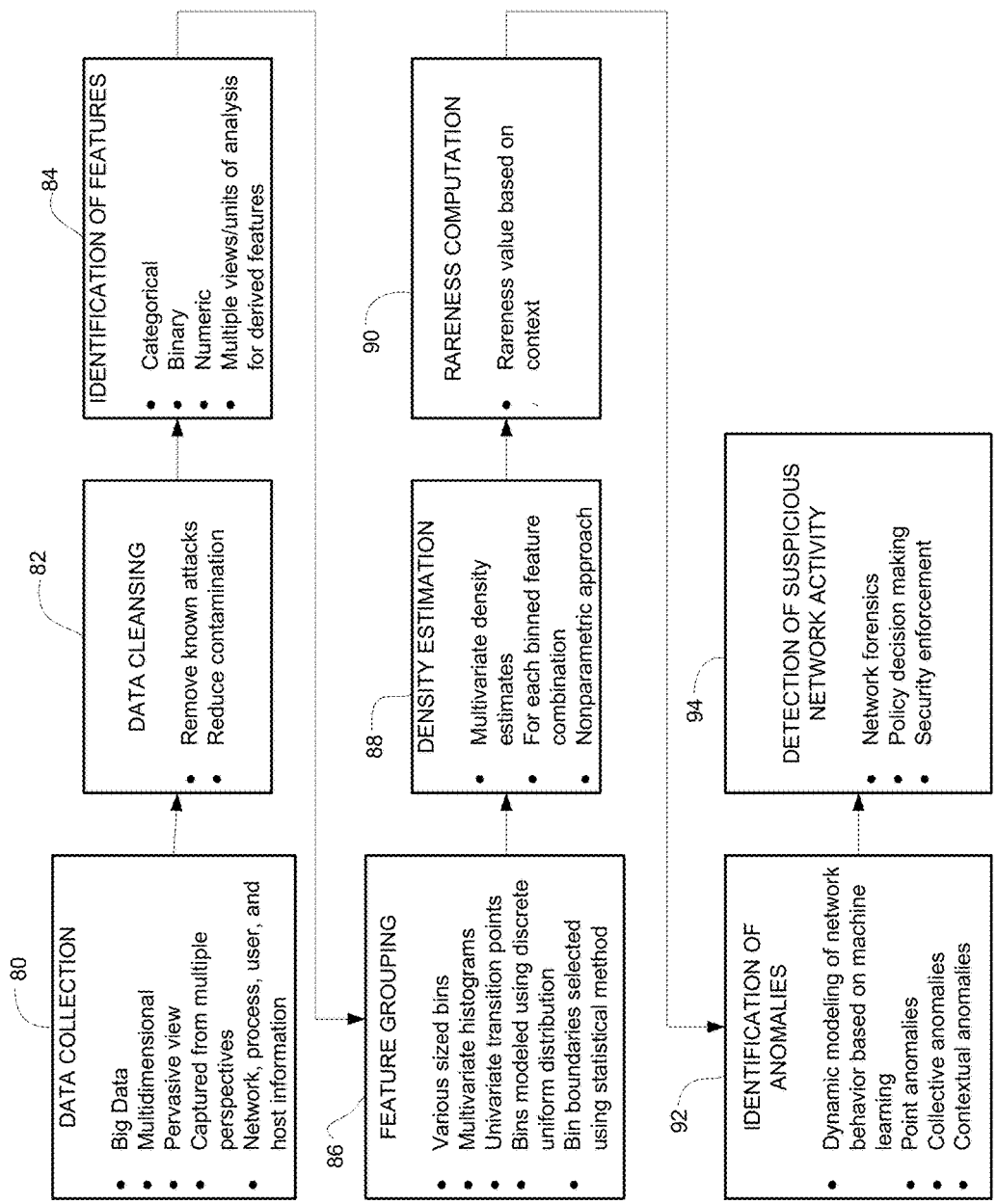
FIG. 5 illustrates a process flow for anomaly detection, in accordance with one embodiment.

FIG. 5 illustrates an overview of a process flow for anomaly detection, in accordance with one embodiment. As described above with respect to FIG. 1, the data may be collected at sensors 26 located throughout the network to monitor all packets passing through the network (step 80). The data may comprise, for example, raw flow data. The data collected may be big data (i.e., comprising large data sets having different types of data) and may be multidimensional. The data is captured from multiple perspectives within the network to provide a pervasive network view. The data collected may include network information, process information, user information, and host information, for example.

In one or more embodiments the data source undergoes cleansing and processing at step 82. In data cleansing, rule-based algorithms may be applied and known attacks removed from the data for input to anomaly detection. This may be done to reduce contamination of density estimates from known malicious activity, for example.

Features are identified (derived, generated) for the data at step 84. The collected data may comprise any number of features. Features may be expressed, for example, as vectors, arrays, tables, columns, graphs, or any other representation. The network metadata features may be mixed and involve categorical, binary, and numeric features, for example. The feature distributions may be irregular and exhibit spikiness and pockets of sparsity. The scales may differ, features may not be independent, and may exhibit irregular relationships. The embodiments described herein provide an anomaly detection system appropriate for data with these characteristics. As described below, a nonparametric, scalable method is defined for identifying network traffic anomalies in multidimensional data with many features.

The raw features may be used to derive consolidated signals. For example, from the flow level data, the average bytes per packet may be calculated for each flow direction. The forward to reverse byte ratio and packet ratio may also be computed. Additionally, forward and reverse TCP flags (such as SYN (synchronize), PSH (push), FIN (finish), etc.) may be categorized as both missing, both zero, both one, both greater than one, only forward, and only reverse. Derived logarithmic transformations may be produced for many of the numeric (right skewed) features. Feature sets may also be derived for different levels of analysis.

In certain embodiments discrete numeric features (e.g., byte count and packet count) are placed into bins of varying size (width, range) (step 86). Univariate transition points may be used so that bin ranges are defined by changes in the observed data. For example, the features may be grouped into bins comprising bin boundaries selected based on a probability that data within each of the bins follows a discrete uniform distribution. In one example, a statistical test may be used to identify meaningful transition points in the distribution. Details of a smart binning process in accordance with one or more embodiments are described further below. The binned features may be used for density estimation purposes (step 88).

In one or more embodiments, anomaly detection may be based on the cumulative probability of time series binned multivariate feature density estimates (step 88). In one example, a density may be computed for each binned feature combination to provide time series binned feature density estimates. Anomalies may be identified using nonparametric multivariate density estimation. The estimate of multivariate density may be generated based on historical frequencies of the discretized feature combinations. This provides increased data visibility and understandability, assists in outlier investigation and forensics, and provides building blocks for other potential metrics, views, queries, and experiment inputs.

Rareness may then be calculated based on cumulative probability of regions with equal or smaller density (step 90). Rareness may be determined based on an ordering of densities of multivariate cells. In one example, binned feature combinations with the lowest density correspond to the most rare regions. In one or more embodiments, a higher weight may be assigned to more recently observed data and a rareness value computed based on cumulative probability of regions with equal or smaller density. Instead of computing a rareness value for each observation compared to all other observations, a rareness value may be computed based on particular contexts.

New observations with a historically rare combination of features may be labeled as anomalies whereas new observations that correspond to a commonly observed combination of features are not (step 92). The anomalies may include, for example, point anomalies, contextual anomalies, and collective anomalies. Point anomalies are observations that are anomalous with respect to the rest of the data. Contextual anomalies are anomalous with respect to a particular context (or subset of the data). A collective anomaly is a set of observations that are anomalous with respect to the data. All of these types of anomalies are applicable to identifying suspicious activity in network data. In one embodiment, contextual anomalies are defined using members of the same identifier group.

The identified anomalies may be used to detect suspicious network activity potentially indicative of malicious behavior (step 94). The identified anomalies may be used for downstream purposes including network forensics, policy generation, and enforcement. For example, one or more embodiments may be used to automatically generate optimal signatures, which can then be quickly propagated to help contain the spread of a malware family.

Figure 6:
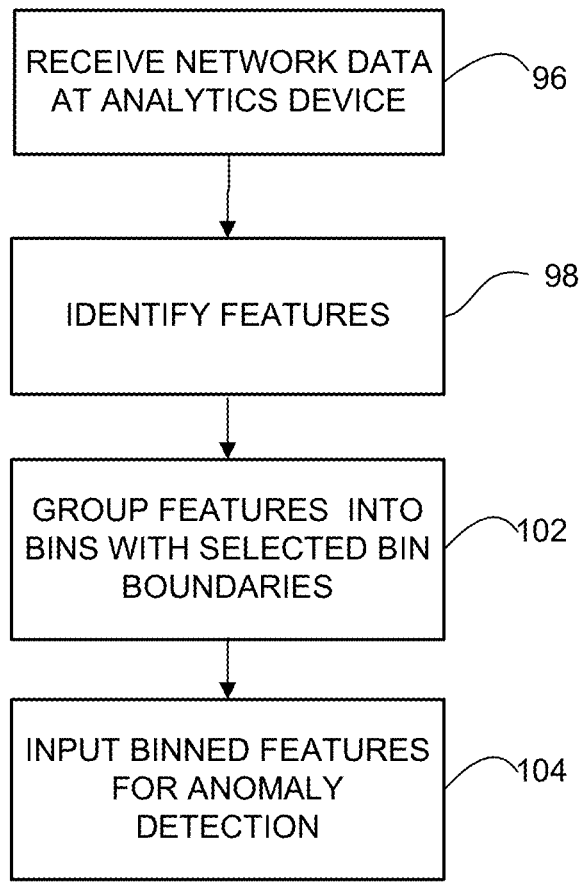
FIG. 6 is a flowchart illustrating an overview of a process for grouping network data features into bins with selected bin boundaries, in accordance with one embodiment.

FIG. 6 is a flowchart illustrating an overview of a process for grouping features into bins and selecting bin boundaries, in accordance with one embodiment. At step 96, network data is received at the analytics device 30 (FIGS. 1 and 6). As described above, the data may be collected from a plurality of sensors 26 to provide a pervasive view of the network. For example, the network data may be collected from a plurality of sensors distributed throughout the network to monitor network flows within the network from multiple perspectives in the network. Features are identified (e.g., features sets are generated, derived) (step 98) (FIG. 6). For each feature, transition points are determined and the feature is grouped into bins of varying width (i.e., at least two of the bins comprise different widths (ranges)) (step 102). The bin boundaries (transition points) may be selected based on a probability that data within each of the bins follows a discrete uniform distribution. In this way, a heterogeneous distribution can be divided into bins in which internal observations are homogenous. Bin boundaries may be identified by characteristics exhibited in the distributions. For example, bin ranges may be defined based on changes in the observed data using a statistical approach for identifying meaningful transitions points in the distribution. An example of a test for determining the probability of observing a set of counts within a bin given an assumed discrete uniform distribution is described below with respect to FIG. 10. The binned features may serve as input to downstream algorithms used to flag unexpected network behavior for use in anomaly detection (step 104). The bin boundaries may be updated upon receiving new network data or updated at periodic intervals, for example.

It is to be understood that the processes shown in FIGS. 5 and 6 and described above are only examples and that steps may be added, combined, removed, or modified without departing from the scope of the embodiments.

Figure 7:
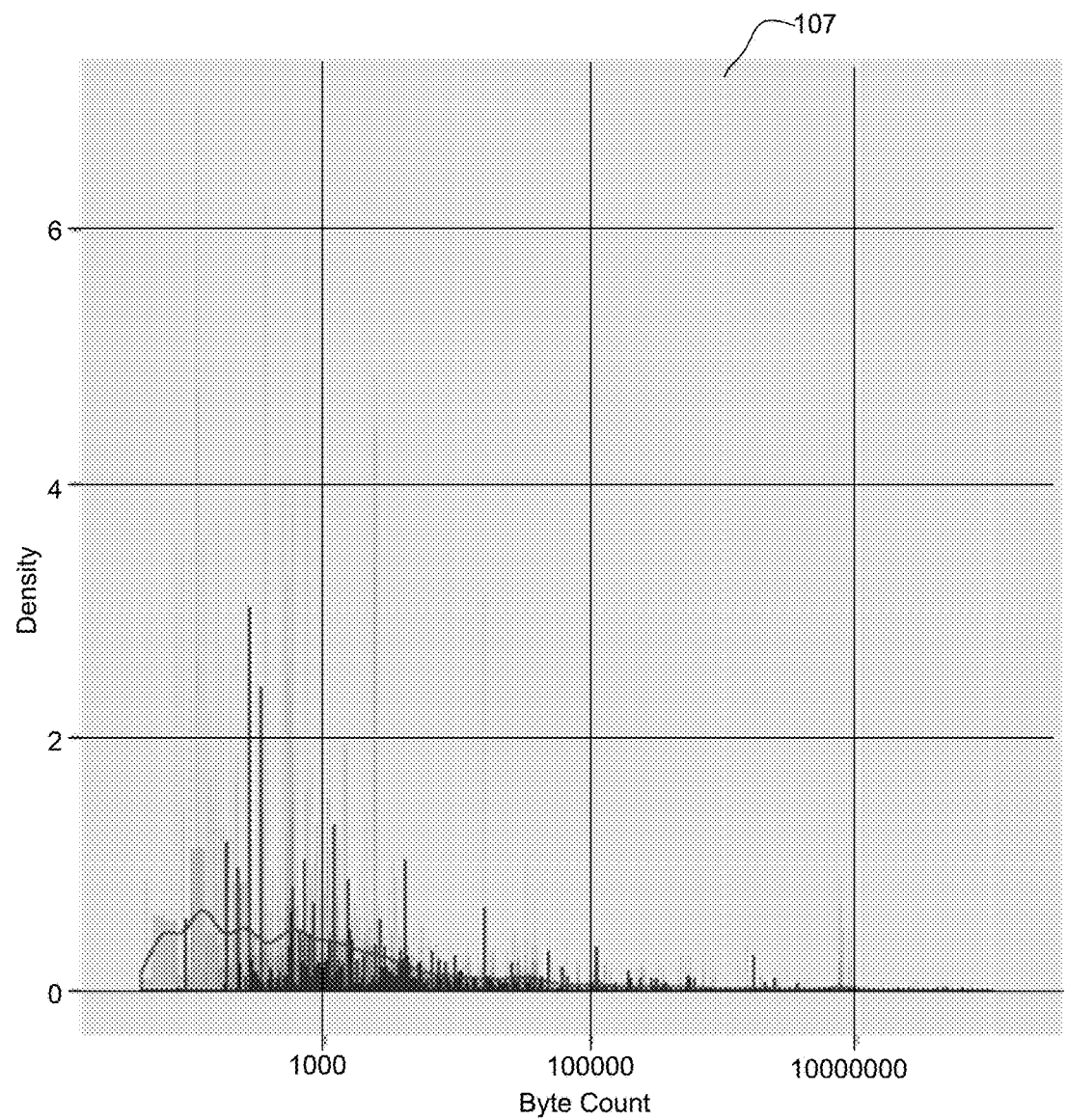
FIG. 7 illustrates an example of distribution spikiness present in network data features.

As previously noted, network metadata with high dimensionality is a powerful data source, yet can be difficult to analyze and draw conclusions from without meaningful processing. Feature lists may be of mixed type (categorical, binary, numeric) and univariate variables often exhibit irregular and varying distributions. For example, network metadata features such as byte count often exhibit extreme spikiness and sparseness, as shown in FIG. 7. The graph of FIG. 7 illustrates density of byte count for collected metadata and shows how the feature exhibits irregular, spiky distributions with areas of sparseness.

Figure 8:
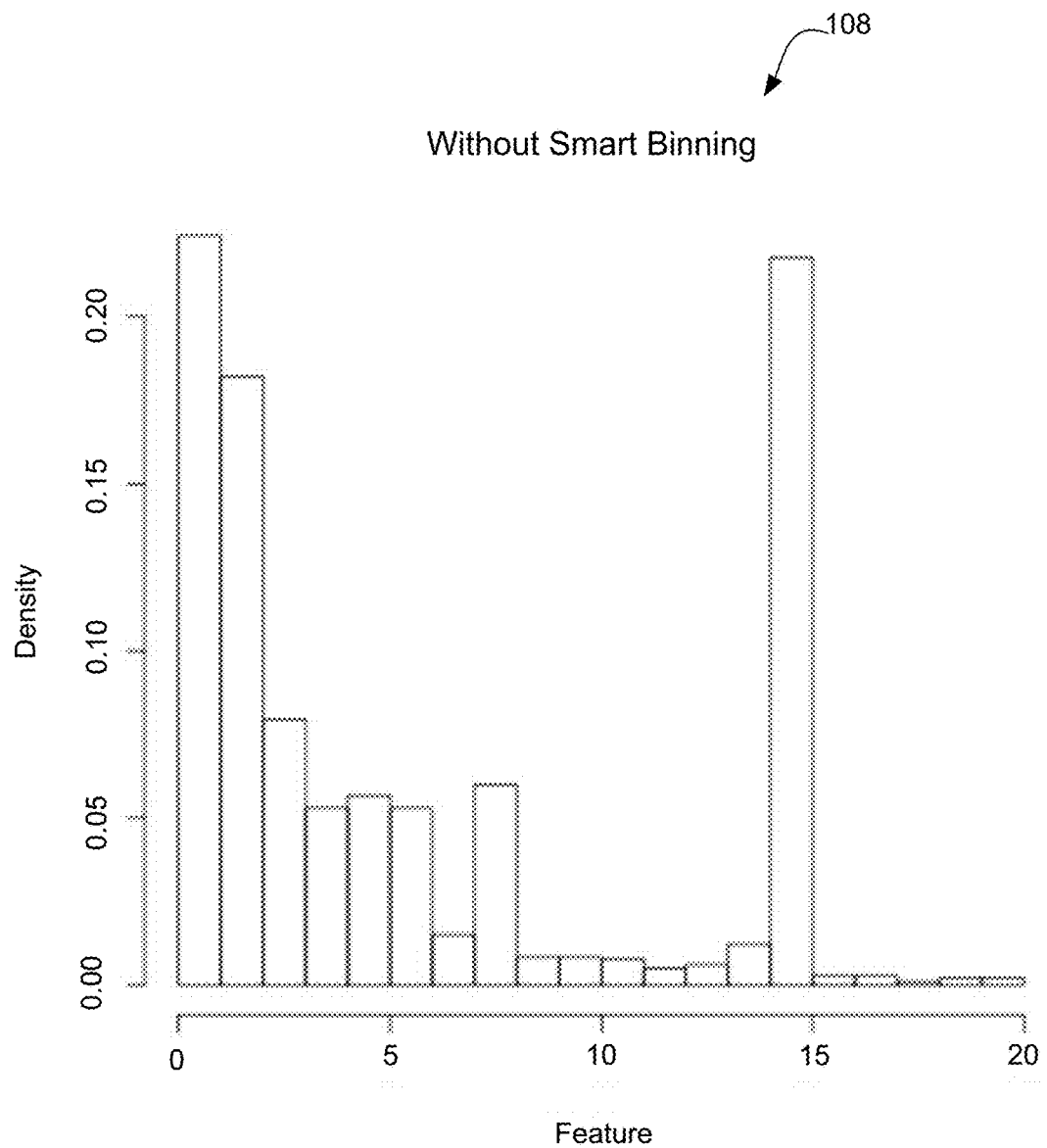
FIG. 8 illustrates an example of feature distribution without smart binning.

Standard binning techniques may not be appropriate for these irregular distributions. Since numeric network metadata tends to be highly skewed, an equal-width bin approach results in most observations falling in a small number of bins, as shown in FIG. 8. Conventional binning techniques may over smooth spikiness, losing important information about the values of these spikes. Furthermore, conventional binning techniques may miss meaningful gaps or sparseness seen in network metadata distributions.

Equal-frequency binning may identify spikes, but has the disadvantage of masking outliers, therefore, it is not appropriate for anomaly detection. Diagonal cut histograms provide a compromise between equal-width and equal frequency approaches to bin boundary definitions and are therefore more appropriate for data with both spikiness and outliers. However, due to the extreme spikiness and sparsity of network metadata, even the diagonal-cut approach results in bins with too much information loss due to smoothing. Implementation of v-optimal histograms is complex and not appropriate for streaming data since bins need to be re-built with the addition of new data.

As described below, one or more embodiments (referred to herein as smart binning) may bin, or summarize, discrete features in a meaningful way, retaining the important transitions exhibited in the data. These binned features may then serve as input for downstream use for anomaly detection. In one or more embodiments, rather than dividing a range of observed values for a feature into bins of the same size, meaningful transition points observed in the univariate data are identified. FIGS. 8 and 9 illustrate a comparison of density of numeric features graphed without smart binning and with smart binning, respectively. The graph 108 of FIG. 8 illustrates an example without smart binning, in which data is grouped based on intervals of equal width. The graph 109 of FIG. 9 illustrates an example with smart binning in accordance with embodiments described herein. The smart binning approach has the effect of retaining the spikiness of the data with bin boundaries assigned to the transitions between spikes and other ranges. Adjacent feature values that correspond to a sharp increase or decrease of observed counts may be selected as bin boundaries. The following describes an example of smart binning, in accordance with one or more embodiments.

After the preliminary processes described above have been performed (e.g., steps 80, 82, and 84 in FIG. 5), the next step is to collapse discrete numeric features (such as byte count, packet count, or any other feature) into bins. Bin ranges may be defined by the changes in the observed data, using a statistical test to identify meaningful transition points in the distribution. The logic follows that since members of the same bin are associated with the same density estimate, each bin is modeled using a discrete uniform distribution. As described further below, a test may be performed to determine the probability of the set of observed counts for a bin and define bin boundaries such that this probability is always larger than a predetermined value (referred to herein as alpha).

Bin boundaries may be determined after a sufficient amount of data is collected and distributions show evidence of stability. At this point, bin boundaries may be selected for each feature independently. This approach is flexible in that the number of bins is not fixed and instead accommodates the variability present in the distributions. However, for regions with little variation, wide bins may be utilized. A larger selected alpha value will result in a larger number of bins. Selecting a large alpha value will provide a larger granularity of data, but results in a need for more storage space. Conversely, a small alpha value will retain a more coarse binned data summary and be more efficient. Therefore, a value for alpha may be selected based on a desired granularity and available storage space.

In one embodiment, bin ranges are defined by changes in the observed data using a statistical approach for identifying meaningful transition points in the distribution. As previously described, the distribution of a feature (e.g., bytes in network flow) may show regions of narrow spikes, pockets of sparseness, and areas of smooth coverage. A statistical method may be used to identify transitions between these different regions. The heterogeneous distribution may be divided into bins, of which observations internally are homogenous. Since members of the same bin are associated with the same density estimate (constant), each bin is modeled given an assumed discrete uniform distribution. For a candidate bin boundary, a test may be performed to determine the probability of observing the set of counts within this bin given an assumed discrete uniform distribution. If the probability exceeds a predefined value (alpha), it is concluded that the bin boundaries are appropriate. If there is no evidence to suggest that the underlying data within the bin does not follow a discrete uniform distribution, it is concluded that the bin boundaries are acceptable. However, if the data shows that the probability of observing the given frequency counts, given a discrete uniform distribution with the bin is unlikely, the bin boundaries are rejected, concluding that the bin exhibits heterogeneous data characteristics. In this scenario, the bin is subdivided so that each bin exhibits data homogeneity within the bin. Bin boundaries may be defined such that the probability of the test is always larger than a predetermined value, alpha. In one example an alpha value such as 0.05 may be used. It is to be understood that different values of alpha (e.g., more or less than 0.05) may be appropriate and used without departing from the scope of the embodiments.

Figure 10:
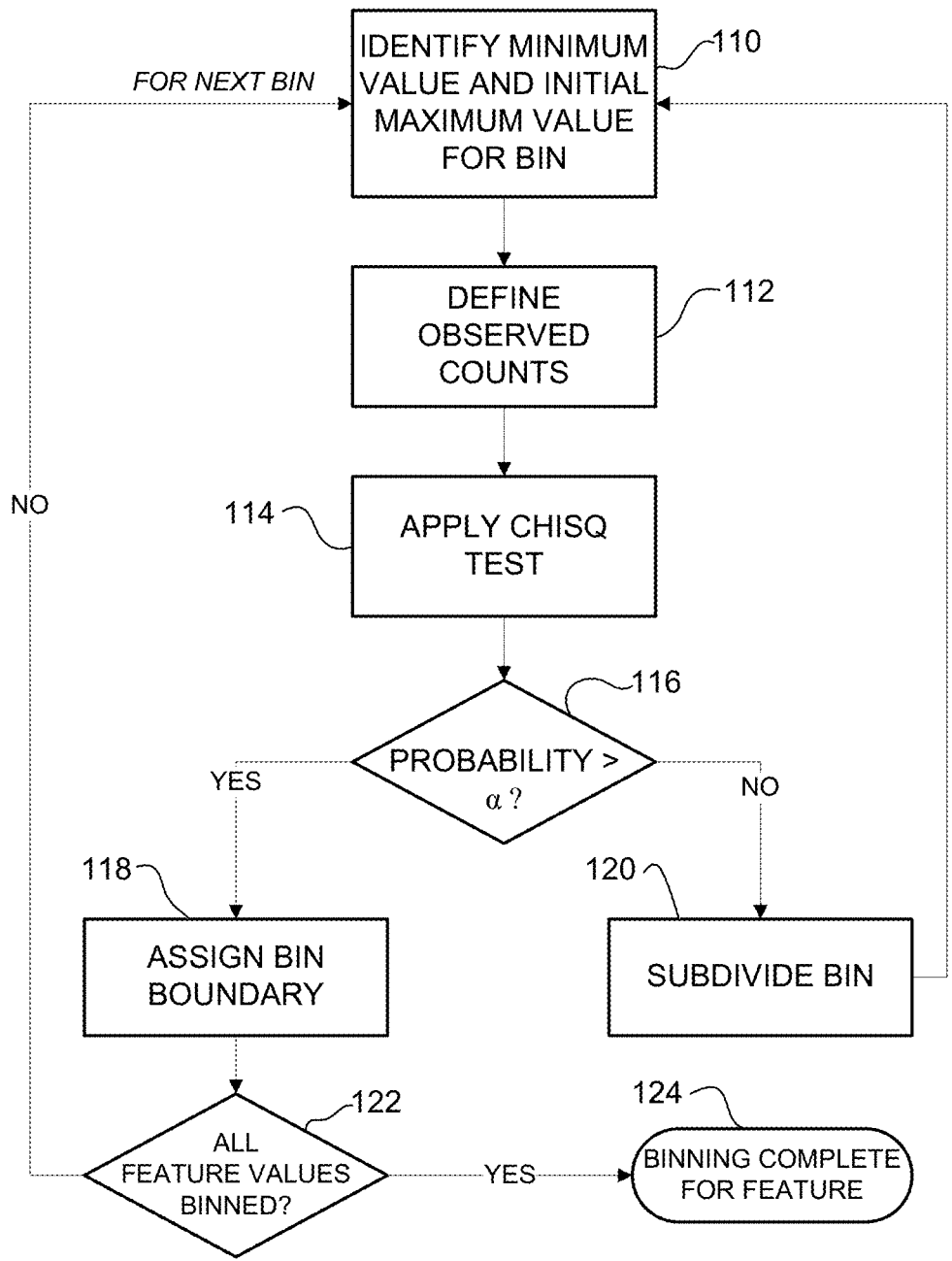
FIG. 10 is a flowchart illustrating a statistical approach for selecting bin boundaries, in accordance with one embodiment.

FIG. 10 illustrates an example of a statistical approach that may be used to select bin boundaries and group features (step 102 in FIG. 6). In one example, for each of the features, the process starts with the minimum value of the feature (min(x)) and assigns it to the minimum of the first bin. The initial maximum value assigned to this bin is min(x)+1 (step 110). Two observed counts for the values within this bin are defined as $O_1$ (the number of observations of value min(x)) and $O_2$ (the number of observations of value min(x)+1) (step 112). In certain embodiments, the Pearson chi-square (CHISQ) test of equal proportions may be used to test the null hypothesis that the proportions (probabilities of success) of the two values are the same (step 114). The Pearson chi-square test is a statistical test applied to sets of categorical data to evaluate how likely it is that any observed difference between the sets arose by chance. If the probability is sufficiently large (as defined by alpha), then it is concluded that the observed counts ($O_1$ and $O_2$) could be drawn from populations with equal proportions and, therefore, should be within the same bin (steps 116 and 118). If the probability does not exceed alpha, the population proportions are concluded to be unequal and the bin should be subdivided (steps 116 and 120). In this case, the bin may be subdivided into two bins with different probabilities of success (each containing a single feature value). If the null is not rejected, the maximum value of the bin is extended by one and all member counts of the bin range ($O_1$, $O_2$, $O_3$) are tested to determine whether the proportions are equal (steps 110, 112, and 114). Whenever the null test is rejected, bin boundaries are set at the bin boundary preceding the rejected test (the maximum bin size in which the null hypothesis has not been rejected). After all values of the feature are included, the bin boundaries have been assigned (steps 122 and 124). As described above, density estimates (e.g., multivariate density estimates) may be obtained for the binned data for use in anomaly detection.

It is to be understood that the process shown in FIG. 10 and described above is only an example and that steps may be modified, added, combined, or removed, without departing from the scope of the embodiments. Furthermore, the process described above for defining transition points in the observed data is only an example and other processes may be used, without departing from the scope of the embodiments. For example, different statistical approaches may be used and the Pearson chi-square test is only an example. The smart binning described herein may support any number of features and different types (e.g., categorical, ordinal, numeric).

As can be observed from the foregoing, the embodiments described herein provide numerous advantages. One or more embodiments provide a nonparametric, scalable method for identifying network traffic anomalies in multidimensional data with many features. Bins of varying sizes may be beneficial for reducing noise (regions of low density) and gaining precision (regions of high density). Smart binning allows for computational efficiency so that estimates may be based on a large volume of data. The statistical approach described above for identifying meaningful transitions in the data is advantageous as compared to blind approaches because bin boundaries account for characteristics exhibited in the data and are not fixed. Furthermore, the embodiments are advantageous for data distributions exhibited in network metadata, due to the particular characteristics exhibited in this domain. More specifically, the highly skewed, highly irregular distributions may show regions of spikiness and regions of sparseness. Conventional systems tend to over smooth spikiness and are not able to fully capture the rich information present in the distributions in this domain, and therefore perform poorly for anomaly detection. The statistically defined bin boundaries described herein ideally capture a variety of distribution characteristics, including both spikes and areas of sparseness. The embodiments described herein provide an efficient method and apparatus for implementing anomaly detection objects that preserve the important characteristics of the numeric network metadata features while reducing noise and redundancy, thereby minimizing data storage requirements.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving network data at a processor of an analytics device, the network data collected from a plurality of sensors distributed throughout a network to monitor network flows within the network from multiple perspectives in the network;
   processing the network data at the processor of the analytics device, wherein processing comprises:
   identifying features for the network data;
   determining transition points for each of said features in a histogram;
   grouping each of said features into bins of varying width in the histogram, wherein said width defines a range of said features in each of said bins;
   wherein said transition points define bin boundaries in the histogram, said transition points selected based on a probability that data within each of the bins follows a discrete uniform distribution; and
   inputting said binned features into an algorithm for anomaly detection.

2. The method of claim 1 wherein said bin boundaries are assigned at transition points within the features.

3. The method of claim 1 further comprising updating said bin boundaries upon receiving new network data.

4. The method of claim 1 wherein each of said features comprises univariate data.

5. The method of claim 1 wherein said features comprise numeric features.

6. The method of claim 1 further comprising defining said bin boundaries utilizing a Pearson chi-square test to determine said probability.

7. The method of claim 1 further comprising identifying observation counts for minimum and maximum values of one of said bins for use in testing said probability.

8. The method of claim 1 wherein said probability is compared to a predetermined value selected based on a desired granularity of data and available storage space.

9. The method of claim 1 wherein said selected bin boundaries retain distribution characteristics comprising spikes and areas of sparseness in said binned features.

10. The method of claim 1 wherein the network data is collected from a plurality of sensors distributed throughout a network to monitor network flows within the network from multiple perspectives in the network.

11. An apparatus comprising:
    an interface for receiving network data; and
    a processor for identifying features for the network data, determining transition points for each of said features in a histogram, grouping each of said features into bins of varying width in the histogram, and inputting said binned features into an algorithm for anomaly detection;
    wherein the transition points define bin boundaries in the histogram, said transition points selected based on a probability that data within each of the bins follows a discrete uniform distribution and wherein said width defines a range of said features in each of said bins.

12. The apparatus of claim 11 wherein said bin boundaries are assigned at transition points within the features.

13. The apparatus of claim 11 wherein the processor is further configured to define said bin boundaries utilizing a Pearson chi-square test to determine said probability.

14. The apparatus of claim 11 wherein said probability is compared to a predetermined value selected based on a desired granularity of data and available storage space.

15. The apparatus of claim 11 wherein said selected bin boundaries retain distribution characteristics comprising spikes and areas of sparseness in said binned features.

16. The apparatus of claim 11 wherein the network data is collected from a plurality of sensors distributed throughout a network to monitor network flows within the network from multiple perspectives in the network.

17. Logic encoded on one or more non-transitory computer readable media for execution and when executed operable to:
    identify features for network data;
    determine transition points for each of said features in a histogram;
    group each of said features into bins of varying width in the histogram, wherein said width defines a range of said features in each of said bins; and
    input said binned features into an algorithm for anomaly detection;
    wherein said transition points define bin boundaries in the histogram, said transition points selected based on a probability that data within each of the bins follows a discrete uniform distribution.

18. The logic of claim 17 further operable to identify observation counts for minimum and maximum values of one of said bins for use in testing said probability.

19. The logic of claim 17 wherein said probability is compared to a predetermined value selected based on a desired granularity of data and available storage space.

20. The logic of claim 17 wherein the network data is collected from a plurality of sensors distributed throughout a network to monitor network flows within the network from multiple perspectives in the network.

* * * * *